Dec. 13, 1955          F. J. COZZOLI          2,726,771
PROCESSING PLATE AND RACK FOR HANDLING
AMPULS AND THE LIKE IN BULK LOTS
Filed July 21, 1951

INVENTOR.
BY Frank J. Cozzoli

Harold F. Scribner
ATTORNEY

United States Patent Office 2,726,771
Patented Dec. 13, 1955

2,726,771

PROCESSING PLATE AND RACK FOR HANDLING AMPULS AND THE LIKE IN BULK LOTS

Frank J. Cozzoli, Plainfield, N. J.

Application July 21, 1951, Serial No. 237,971

2 Claims. (Cl. 211—74)

The present invention relates to the handling of small articles in bulk lots in such manner as readily to organize and condition the articles for subsequent treatment and is concerned particularly with the handling in bulk lots of small containers such as vials and ampuls.

The small containers for which the invention is adapted, are obtained from the manufacturer usually in individual cartons each containing one hundred or more, and the primary aim of the invention is to render available an efficient method and means for removing the containers from the box in an orderly arranged manner appropriate for temporary storage, or for immediate processing as by washing, sterilizing, drying, followed by filling with a product, and corking, capping, or otherwise sealing. The invention further aims to render available an efficient "tool" by the aid of which the small articles, for example ampuls, may be quickly unloaded from their boxes and automatically arranged in a fixed pattern, such as in uniformly spaced rows, and spaced from each other within rows, whereby the lot of ampuls is at once arranged in a manner convenient for further handling.

Due to the fragile nature of the ampules and/or vials, they being made of glass and relatively thin walled, it is not practical to "dump" the box of ampuls in a mechanical sorting machine because of the danger of crushing and fracturing and the danger of flying particles of glass. The present invention undertakes to provide means for manually unloading fragile particles from their cartons in a manner that will assure the least possible injury or damage thereto, the same means being useful subsequently as a storage device for the articles thereby to eliminate the need for individual handling after unpacking.

A further objective of the invention is to render available a device, operable by hand, to unload fragile articles from their packaging boxes, a device useful as a holder or storage medium for the articles, and a device that may itself with its load of articles become an element of an article processing machine and subsequently removed as a unit without handling or touching the processed ampuls. The primary purpose of the device being to avoid tedious individual handling, to facilitate and expedite unloading, processing, and/or storage of the ampuls or vials in bulk lots, and meanwhile to observe and maintain sterility requirements, instead of the slow individual handling and treating and manual handling thereafter that heretofore was commonly practiced.

In attaining the aims of the invention it is proposed to construct a plate member of durable material, preferably a material capable of withstanding sterilization temperatures and processing agents of one kind or another, and of such an area or expanse as to cover the area occupied by the normal complement of articles contained in a package.

In the case of ampul handling, the plate will be of a size to cover a box of ampuls and will be perforated with rows of holes on center distances substantially equalling the spacing of the ampuls in the box and preferably slightly greater. Also the perforations in the plate will be smaller than the body size of the ampuls but larger than the size of the constricted neck portions of the ampuls. The plate will also be provided with a plurality of spindles spaced from each other and projecting from both sides of the plate, the location of the spindles being outside of the field or area of the perforations and preferably outside of the outside dimensions of the box or cartons containing the ampuls. The purpose of the two-way extending spindles being varied, among which may be mentioned (a) to provide guide means enabling the operator quickly to place the field of perforations of the plate in approximate registry with the ampuls standing in the box, (b) to serve as leg standards upon which the plate and a change of ampuls may stand without the ampuls themselves being in engagement with the supporting surface, (c) to serve as plate extensions by means of which a plurality of plates containing ampuls may be racked, one upon another, without the tip ends of the ampuls in one plane striking the body ends of the ampuls in another plane, (d) to serve as a means for registering the plate and a change of ampuls with cooperating elements of an ampul processing machine, such as washing apparatus, filling apparatus, or sealing apparatus so that the plate and a complement of ampuls may conjointly with other equipment become a removable and interchangeable part of the processing equipment.

A device of the character envisaged by this invention, has, it will be seen, many uses and advantages, the primary ones being to facilitate the unloading of the articles in bulk lots or quantities, to simultaneously arrange them according to a fixed usable pattern without further handling, to provide a storage medium useful singly or in stacks, and useful as an instrument as the occasion may require, of a treating or processing apparatus, and to enable one or more of the foregoing operations to be achieved without recourse to manual handling of the individual ampuls.

Other objects and advantages will be in part indicated in the following description and in part rendered apparent therefrom in connection with the annexed drawings.

To enable others skilled in the art to fully comprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Fig. 1 of the drawings is a plan view of a processing plate embodying the invention.

Figure 1:
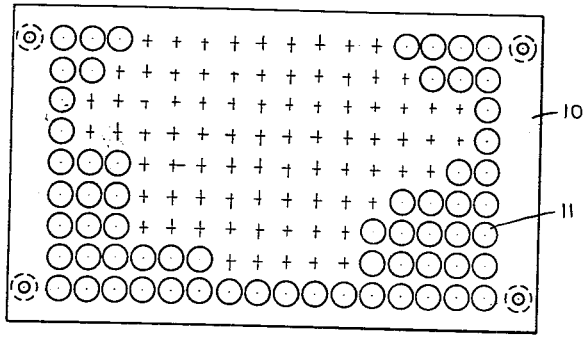
Figure 2:
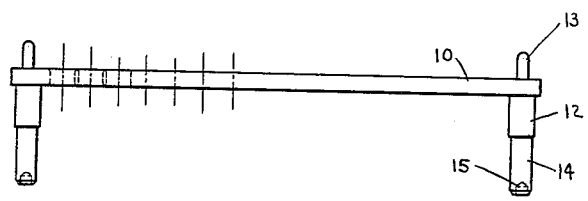
Fig. 2 is a side view of the plate, illustrating more clearly the two-way extending spindles thereof.
Figure 3:
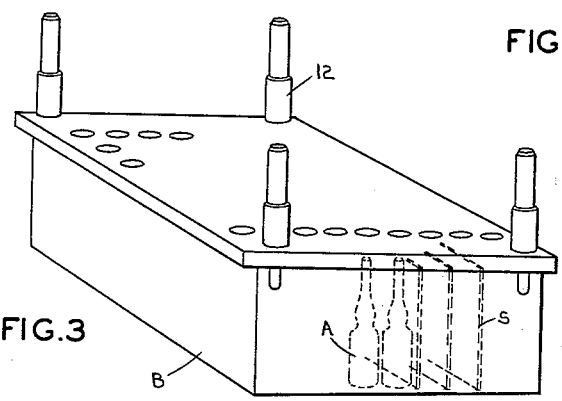
Fig. 3 is a view of the plate associated with a box of upstanding ampuls.
Figure 4:
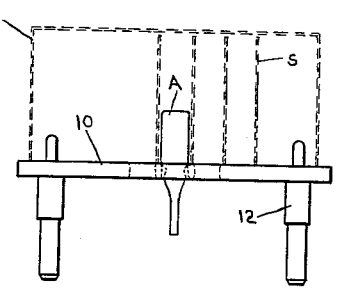
Fig. 4 is a view of a plate and its complement of ampuls that have been unloaded from their original packing box.
Figure 6:
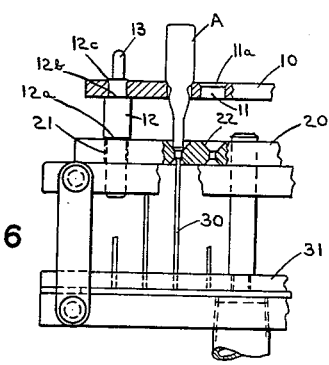
Fig. 6 is a sectional view of a portion of the plate and one of its spindles in coacting relation to elements of one form of processing mechanism.

Referring to Figs. 1, 4, and 6 of the drawings, a processing plate constructed in accordance with this invention will comprise a comparatively flat plate member 10, constructed preferably of material such as treated aluminum, fibre or one of the present day plastic materials adapted to resist processing agents. It is desirable, however, that the plate be relatively light in weight to facilitate handling and at the same time be rugged and durable. Also the plate will preferably be of substantial thickness, as indicated in Fig. 6, so that the perforations 11 therein will have a certain extent of axial length. The upper ends of the perforations should be chamfered as at 11a to afford a surface against which the ampuls will shoulder and tend to become self-centered thereby.

In the embodiment disclosed, the process plate 10 is equipped with a plurality of two-way projecting spindles 12, located outside the field of the perforations 11. In the preferred form of the invention, the spindles are positioned in the corners of the plate on lines corresponding to the first and last row of ampul receiving openings or performations 11. In this example, the ampul receiving openings are arranged in rows, nine openings one way and sixteen openings the other, making 144 in all which corresponds with the number of ampuls packaged in a box.

Figure 5:
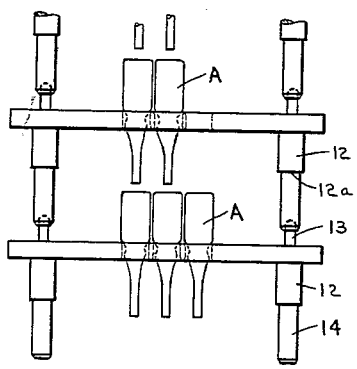
Fig. 5 is a view of several plates as racked for storage.

The plate spindles 12 are each constructed with a relatively short extension 13 that projects from the upper side of the plate 10, and a relatively long extension 14 that projects from, the lower side of the plate 10. Extensions 13 will be smaller in diameter than the lower extensions 14 and have their upper ends somewhat rounded as indicated. The lower extensions will be long enough to extend beyond the tip ends of the articles, such as ampuls, indicated at A, suspended in the openings in the plate 10, so that a plate containing a change of ampuls may rest upon a surface without the tips of the ampuls striking that surface. The extreme lower ends of the extensions 14 are preferably cupped or indented as at 15, to receive the rounded ends of the extensions 13, as will be explained later. The relative lengths of the spindle extensions 13 and 14 should be such that when one plate is racked upon another, as represented in Fig. 5, the intervening space between plates will substantially equal the length of the body portion of the ampul in the lower plate, plus the length of the constricted projecting portion of the ampul in the superposed rack, plus a reasonable amount for clearance between the tip ends and body ends of the two banks.

A preferred construction of the spindles 12 is illustrated in Fig. 6 which consists in making them from round stock and progressively stepping the size so as to form shoulders 12a, 12b, and 12c. The spindles are inserted in openings formed in the plate 10 from the underside so that the plate rests upon the shoulder 12b. The shoulder 12c, in the instant embodiment, is spaced from the shoulder 12b, a distance substantially equalling the thickness of the plate 10 and its rim may be swaged or peened over the plate to anchor the spindle thereto. Other methods of anchoring the spindles may be, of course, employed.

The lower shoulder 12a on the spindles may be provided so that, if desired, the effective length of the projection may be reduced, so that for example, the plate may be used in conjunction with a processing apparatus, wherein the shoulder 12a would function to shorten the effective length of the projecting spindle. Fig. 6 illustrates, by way of example, a portion of one form of apparatus, namely washing apparatus, to which a processing plate of this character is adapted. In this figure, a portion of an ampul-centering and needle-centering plate 20 in elevated position is illustrated. The centering plate is provided with a plurality of openings 21 corresponding with the spacing of the spindles 12. The lower ends of the spindles as stated beyond the tip ends of the ampuls and the plate with a change of ampuls is placed over the centering plate with the lower ends of the spindle 12 in registry with the holes 21, and in that position lowered relative to plate 20 until its descent is stopped by shoulder 12a coming to rest upon the plate 20. Plate 20, in this example, is provided with conical recesses 22 corresponding in number and located as to match the openings in the processing plate 10. The final movement in the descent of the plate 10, piloted by the spindles 12 in plate 20, brings the tip ends of the ampuls against the cones 22 and raises the body portion of the ampuls a short distance out of the openings 11 in the processing plate. This action assures centering of the ampul ends in the cones.

The exemplified washing apparatus also may include a plurality of washing needles or jets 30, also aligned with the cones 22, and the top ends of the needles are guided in openings in the apexes of the cones. When the parts are positioned as indicated in Fig. 6, the centering plate is lowered relative to the needles 30 whereby the latter are caused to telescope the ampuls previously centered by the cones of the plate 20. Lowering of the plate 20 with plate 10, continues until the lower ends of the spindles 12 engage a relatively fixed surface 31, and a further lowering movement of plate 20 relative to plate 10 causes the plate 10 to again project the ampuls and lift their tip ends slightly out of the cones 22. At this stage, the washing needles will have become inserted into the ampuls the required distance and the washing agents may be injected through the needles to the interior of the ampuls, the injected fluid draining from the inverted ampuls via the space maintained between their tips and the cone recesses.

On completion of a washing cycle, the plate 20 is elevated. The initial upward movement brings the cones 22 again into engagement with the ampul ends, and a further movement brings the plate into engagement with the shoulders 12a, thereafter both plates (10 and 20) move together until the needles have been withdrawn from the ampuls and the parts restored to starting position indicated in Fig. 6. The operator will then lift the plate 10 out of the locating openings 21, thus again pocketing the ampuls in openings 11, and place it and its charge to one side. During the foregoing operations and particularly the operations following the washing, the operator handles only the plate 10, it being unnecessary to handle the ampuls per se.

In using the process plate 10 for an unloading operation, the operator will remove the cover from a box of ampuls indicated at B, and withdraw one or more of the perimetral box liners that are customarily placed around the ampuls in the box, to free the ampuls and to let them stand somewhat loosely. The process plate 10 is then placed on the open box, the short spindle extensions outside and downwardly directed and serving as box guides, and the openings 11 aligned by eye with the ampuls in the box. Thereafter both box and plate, while held firmly together, are inverted thus causing the ampuls to fall by gravity into the openings 11 in the plate 10 where they become pocketed and retained in orderly fashion as illustrated in Fig. 4. After all the ampuls have dropped into their respective openings, the box B indicated in dotted lines in Fig. 4, is lifted off and the spacer strips S that define the rows in the box are removed. In this way a gross (144 units) of ampuls are removed from the box in a simple operation and in a moment's time. Compared with prior methods requiring individual handling, the process plate of the instant invention, renders the operation exceptionally fast. Not only is the unloading greatly expedited but the ampuls, when pocketed in the plate 10, are arranged and maintained in orderly arrangement suitable for subsequent processing operations, and in inverted position so that foreign particles cannot fall into their interiors. If it is desired to unload the ampuls from the process plate, a box or tray may be placed over the body portions of the ampuls and both tray and plate inverted as a unit. After inversion, the process plate may be lifted off, having the ampuls standing in the tray.

Storage problems are also minimized by the aid of this invention, for the process plates with their two-way projecting spindles, has been so conceived that boxes of ampuls may be efficiently unpacked and stored by racking the plates one upon the other (Fig. 5) or immediately processed as for example the working process indicated in Fig. 6, and then racked for storage or further processing. In all operations, the operator handles but one plate and by manipulating the plate in various ways, ampuls or vials or like articles may be processed in bulk lots with appreciable savings in time and expense.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A processing device for use in removing ampuls or the like from their package or carton by inverting an opened box of ampuls on to the device and for handling the ampuls in bulk lots, consisting of a plate member having a plurality of ampul-receiving openings therein located substantially in accordance with the location of the ampuls in the package or carton, each of said openings being larger than the neck diameter of the ampul and smaller than the body diameter of the ampul, and said plate member being equipped with a plurality of spindle elements projecting from both sides thereof at regions outside the bank of ampul openings and within the margins of the plate, the said two-way projecting spindles being in respective alignment and the projection from one side of the plate member being longer than the distance an ampul stem projects from the plate from the said one side, and the spindle projection from the other side of the plate being shorter than the body length of the ampul that extends from the said other side of the plate, said longer extending spindle projections providing leg elements for the plate member operative when the plate is placed upon a surface to position the projecting stem ends of the ampuls in spaced relation from the said surface and said shorter extending spindle projections providing means for locating the plate in inverted position upon a box of ampuls so that the openings in the plate are in substantial registry with the axes of the ampuls in the box and so that when the box and plate are inverted as a unit together the ampuls fall by gravity into the plate openings and therein confined, and male and female end portions on each of said spindle elements adapted for mutual cooperation with spindle elements of another like plate whereby one plate may be racked upon another, the length of said lower spindle projection of one plate plus the length of the upward extending projection of another plate being at least equal to the length of the body portion of ampuls confined in one plate and the length of the projecting neck portions of ampuls confined in the plate next above, and said spindle projections extending from the lower side of the plate being formed with an annular shoulder at a region closer to the plate than the tip ends of the ampuls operative when the shoulders are brought to rest upon a surface to reduce the effective length of said lower projections so that the said projecting stem ends of the ampuls may be caused to engage the said surface thereby to effect relative movement between the ampuls and the plate member.

2. A processing device for use in removing ampuls or the like from their package or carton by inverting an opened box of ampuls on to the device and for handling the ampuls in bulk lots, consisting of a plate member having a plurality of ampul-receiving openings therein located substantially in accordance with the location of the ampuls in the package or carton, each of said openings being larger than the neck diameter of the ampul and smaller than the body diameter of the ampul, and said plate member being equipped with a plurality of spindle elements projecting from both sides thereof at regions outside the bank of ampul openings and within the margins of the plate, the said two-way projecting spindles being in respective alignment and the projection from one side of the plate member being longer than the distance an ampul stem projects from the plate from the said one side, and the spindle projection from the other side of the plate being shorter than the body length of the ampul that extends from the said other side of the plate, said longer extending spindle projections providing leg elements for the plate member operative when the plate is placed upon a surface to position the projecting stem ends of the ampuls in spaced relation from the said surface and said shorter extending spindle projections providing means for locating the plate in inverted position upon a box of ampuls so that the openings in the plate are in substantial registry with the axes of the ampuls in the box and so that when the box and plate are inverted as a unit together the ampuls fall by gravity into the plate openings and therein confined, and male and female end portions on each of said spindle elements adapted for mutual cooperation with spindle elements of another like plate whereby one plate may be racked upon another, the length of said lower spindle projection of one plate plus the length of the upward extending projection of another plate being at least equal to the length of the body portion of ampuls confined in one plate and the length of the projecting neck portions of ampuls confined in the plate next above, and said spindle projections extending from the lower side of the plate being formed with an annular shoulder operative when the shoulders are brought to rest upon a surface to reduce the effective length of said lower projections so that the said projecting stem ends of the ampuls may be caused to engage the surface.

References Cited in the file of this patent

UNITED STATES PATENTS

| Number | Name | Date |
|---|---|---|
| 211,200 | Werner | Jan. 7, 1879 |
| 572,660 | Orr | Dec. 8, 1896 |
| 1,352,490 | Wilkins | Sept. 14, 1920 |
| 1,355,486 | Longenecker | Oct. 12, 1920 |
| 1,463,805 | Faber | Aug. 7, 1923 |
| 2,061,495 | Woodruff | Nov. 17, 1936 |
| 2,112,486 | Francis et al. | Mar. 29, 1938 |
| 2,322,797 | Fishel | June 29, 1943 |
| 2,354,118 | Hansen | July 18, 1944 |
| 2,419,040 | Stepanian | Apr. 15, 1947 |
| 2,532,604 | Carski | Dec. 5, 1950 |
| 2,546,385 | Christina | Mar. 27, 1951 |

FOREIGN PATENTS

| Number | Country | Date |
|---|---|---|
| 2,384 | Great Britain | of 1867 |
| 188,785 | Great Britain | Nov. 20, 1922 |
| 639,573 | Great Britain | June 23, 1950 |